United States Patent [19]

Iwata et al.

[11] Patent Number: 5,335,320
[45] Date of Patent: Aug. 2, 1994

[54] GRAPHICAL USER INTERFACE EDITING SYSTEM

[75] Inventors: Masatake Iwata; Jun Kurabe; Hiroshi Ichiji, all of Kawasaki, Japan

[73] Assignee: Fuji Xerox Co., Ltd., Japan

[21] Appl. No.: 775,767

[22] Filed: Oct. 15, 1991

[30] Foreign Application Priority Data

Oct. 22, 1990 [JP] Japan .................................. 2-283759

[51] Int. Cl.⁵ .......................... G06F 3/14; G06F 9/06
[52] U.S. Cl. .................................. 395/155; 395/159; 395/700
[58] Field of Search ............... 395/155, 157, 159, 156, 395/160, 700, 650

[56] References Cited

U.S. PATENT DOCUMENTS

| | | | |
|---|---|---|---|
| 4,692,858 | 9/1987 | Redford et al. | 395/157 |
| 4,866,638 | 9/1989 | Cosentino et al. | 395/159 |
| 5,041,992 | 8/1991 | Cunningham et al. | 395/155 X |
| 5,121,477 | 6/1992 | Koopmans et al. | 395/156 |
| 5,179,700 | 1/1993 | Aihara et al. | 395/157 X |
| 5,212,770 | 5/1993 | Smith et al. | 395/155 |
| 5,230,063 | 7/1993 | Hoeber et al. | 395/156 |
| 5,261,042 | 11/1993 | Brandt | 395/156 |
| 5,287,514 | 2/1994 | Gram | 395/700 |

OTHER PUBLICATIONS

The Software Carousel, PC Program Switching Enhancer (Operating Instructions), 1987, pp. 1, 3, 14–17, 44–48, 50–55, 63–69, 72–73.

Primary Examiner—Raymond J. Bayerl
Attorney, Agent, or Firm—Welsh & Katz, Ltd.

[57] ABSTRACT

A graphical user interface (GUI) editing system for developing or editing of a new GUI through a GUI environment provided to a workstation, a personal computer or the like. The system is designed so that user's erroneous operations can be effectively avoided, various sorts of processing are defined for a minimum number of events, the GUI editing can be carried out flexibly under various GUI development environments while not prescribed by the size of GUI elements or by a GUI definition language, whereby such GUI development and editing can be efficiently and flexibly realized on a general-purpose operating system (OS). Further, a denotation procedure of a newly designed or edited GUI developing element to a GUI element database can be remarkably simplified.

12 Claims, 8 Drawing Sheets

| MODE | MEANING | USER ACTION | TRANSITION DESTINATION MODE |
|---|---|---|---|
| NORMAL | WAITING FOR COMMAND INPUT | CLICK LEFT BUTTON ON EDITING AREA ELEMENT | SSELECT |
| | | DRAG LEFT BUTTON ON BROWSER ELEMENT (SELECT 'Create' FROM edit MENU) | CREATE |
| | | SELECT 'End' OR 'File Save' FROM PULL DOWN MENU | CONFIRM |
| | | END OPERATION | END |
| | | SELECT ITEM OF file MENU | TEXTINPUT |
| SSELECT | ONE ELEMENT BEING SELECTED | CLICK RIGHT BUTTON ON EDITING AREA ELEMENT | MSELECT |
| | | CLICK LEFT BUTTON ON BACKGROUND | NORMAL |
| | | PRESS LEFT BUTTON ON EDITING AREA ELEMENT | DIRECTMOVE |
| | | SELECT 'Move' FROM edit MENU | MOVE |
| | | DOUBLY CLICK LEFT BUTTON ON EDITING AREA ELEMENT (SELECT 'Property' FROM edit MENU) | PROPSHEET |
| | | PRESS (DRAG) LEFT BUTTON ON BROWSER ELEMENT (SELECT 'Create' FROM edit MENU) | CREATE |
| | | PRESS LEFT BUTTON ON EDITING AREA ELEMENT 'grip' | RESIZE |
| | | SELECT 'End' OR 'File Save' FROM PULL DOWN MENU | CONFIRM |
| | | END OPERATION | END |
| | | SELECT 'Copy' FROM edit MENU | COPY |
| | | SELECT ITEM OF file MENU | TEXTINPUT |

FIG. 3A

| MODE | MEANING | USER ACTION | TRANSITION DESTINATION MODE |
|---|---|---|---|
| MSELECT | A PLURALITY OF ELEMENTS BEING SELECTED | CLICK LEFT BUTTON ON BACKGROUND | NORMAL |
| | | SELECT 'End' OR 'File Save' FROM PULL DOWN MENU | CONFIRM |
| | | END OPERATION | END |
| | | SELECT ITEM OF file MENU | TEXTINPUT |
| COPY | WAITING FOR COPY DESTINATION INPUT | CLICK LEFT BUTTON IN EDITING AREA | SSELECT |
| MOVE | WAITING FOR MOVEMENT DESTINATION INPUT | CLICK LEFT BUTTON AT MOVEMENT DESTINATION | SSELECT |
| DIRECTMOVE | WAITING FOR MOVEMENT DESTINATION INPUT (WITHOUT USING MENU COMMAND) | RELEASE LEFT BUTTON OR SHIFT CURSOR OUT OF WINDOW | SSELECT |
| | | PRESS SHIFT KEY | CONSTRAINTS MOVE |
| CONSTRAINTS MOVE | ELEMENT MOVABLE ONLY IN HOLIZONTAL OR VERTICAL DIRECTION | RELEASE SHIFT KEY | DIRECTMOVE |
| RESIZE | WAITING FOR ASSIGNMENT OF ELEMENT SIZE | RELEASE LEFT BUTTON | SSELECT |
| CREATE | WAITING FOR ADDITION INPUT OF BROWSER AREA ELEMENT TO EDITING AREA | RELEASE LEFT BUTTON IN EDITING AREA | SSELECT |
| PROPSHEET | WINDOW FOR MODIFICATION OF ATTRIBUTE VALVE BEING OPENED | CLOSE PROPERTY SHEET | SSELECT |
| TEXTINPUT | INPUTTING TEXT | CLOSE TEXT INPUT WINDOW | NORMAL |
| CONFIRM | WAITING FOR CONFIRMATION INPUT | CLOSE CONFIRMATION WINDOW | NORMAL |

FIG. 3B

| 10 | Next | 20 |
|---|---|---|
|  | Name | majorProp |
|  | Prop | 30 |

| 20 | Next | nil |
|---|---|---|
|  | Name | minorProp |
|  | Prop | 60 |

| 30 | Next | 40 |
|---|---|---|
|  | Name | x |
|  | value | 50 |

| 40 | Next | nil |
|---|---|---|
|  | Name | y |
|  | value | 80 |

| 50 | sv | 200 |
|---|---|---|

| 60 | Next | nil |
|---|---|---|
|  | Name | label |
|  | value | 70 |

| 70 | sv | LABEL |
|---|---|---|

| 80 | sv | 300 |
|---|---|---|

FIG. 6

GRAPHICAL USER INTERFACE EDITING SYSTEM

BACKGROUND OF THE INVENTION

1. Field of the Invention

The present invention relates to graphical user interface editing systems for developing or editing a new graphical user interface through a graphic user interface environment provided to a workstation, a personal computer or the like, and, more particularly, to a graphical user interface editing system which enables the realization of efficient and flexible development and editing of such user interface on a general-purpose operating system (OS).

2. Description of the Related Art

Much attention has been recently focused on a graphical user interface (sometimes, abbreviated to GUI, hereinafter) for providing a visual operating environment to, a workstation, a personal computer or the like as means or technique for remarkably enhancing intelligent production through workstations or personal computers.

The GUI is disclosed, for example, in the following literatures, and other studies and developments on the GUI have been advanced in various ways.

* A book titled *"How to Develop an Application on GMW (give me more windows) Window System"* written by Koji Otani, Computer Software, Vol. 17, No. 1 (1990, 1, 16), pp. 45-60.
* An article "Graphical User Interface and its Development Environments", written by Masami Hagiya, pp. 29-46 in a book titled *"Leading Edge of Human Interface"*, Japan Society for Software Science and Technology, issued on Jan. 18, 1990.
* An article "Report on Dialogue Specification Tools" written by M. Green, pp. 9-20 in a book titled *"User Interface Management Systems"*, edited by G. E. Pfaff, published from Springer-Verlag, 1983, 11, 1-3.

*"Human-Computer Interface Development: Concepts and Systems for Its Management"* written by H. Rex Hartson and Deborah Hix, ACM Computing Surveys Vol. 21, No. 1, 1989, 3, pp. 5-92.

Among such GUIs, some techniques such as seen in a Star (developed by Xerox Corporation) have been put to practical use, but since most of such GUI's have been incorporated in operating systems (OSs), there have been difficulties for users themselves to improve or customize them. Even an X window providing such a GUI environment under general-purpose OSs such as UNIX has had many problems including the following problems (1) to (5) from the viewpoints of practicability and flexibility in some actual GUI systems which are becoming a standard as a development environment for the X window.

(1) User's erroneous operation cannot be effectively avoided. For example, when it is desired to design or edit a new GUI through such GUI environment, an assignment of the position of such a GUI element as practically impossible causes the X window to accept the GUI element as GUI data.

(2) The GUI usually accepts as an event a user input through such an input device as a mouse or a keyboard, analyzes the accepted event and executes suitable one of previously defined processing. However, since how to interpret the event is fixed, definition of various sorts of processing requires events to be generated in various ways. In other words, the user inevitably must provide various user inputs in various ways in the course of advancing his operation.

(3) Predetermined sizes of memory areas are allocated to respective GUI elements to store necessary data therein. Therefore, when it is desired to design or edit a new GUI through a different GUI environment, it is necessary to modify the editing system itself according to the elements in the application GUI environment.

(4) Further, since the structure of a GUI definition language is also fixed for each of the GUI environments, when it is desired to design or edit a new GUI through a different GUI environment, it is also necessary to modify the editing system itself according to the elements in the application GUI environment.

(5) When it is desired to register a newly defined GUI developing element in a GUI element database, the user must type and input the attribute name and attribute value of the defined element through a troublesome procedure.

In this way, the prior art GUI development environment, even if it is possible to form the environment on a general-purpose OS, has such problems (1) to (5) as listed above, which have been desired to solve as fast as possible, in particular, from its flexibility viewpoint.

SUMMARY OF THE INVENTION

In view of such circumstances, it is therefore an object of the present invention to provide a GUI editing system which, even when it is desired to design or edit a new GUI through a different GUI environment formed on a general-purpose OS, can solve the above problems in the prior art and can realize its efficient and flexible GUI editing operation.

Another object of the present invention is to provide a GUI editing system which can effectively avoid user's erroneous operation.

A further object of the present invention is to provide a GUI editing system which can define various sorts of processing with respect to a minimum number of events.

Yet another object of the present invention is to provide a GUI editing system which can perform its flexible GUI editing operation under various GUI development environments while not prescribed by the size of GUI elements or a GUI definition language.

Yet a further object of the present invention is to provide a GUI editing system which can remarkably simplify a denotation procedure of a newly designed or edited GUI developing element in a GUI element database.

In order to attain the above objects, in accordance with an aspect of the present invention, there is provided a graphical user interface editing system which comprises browser means for performing management over a plurality of graphical user interface elements; edit data manager means for performing management over a graphical user interface data of each of the elements to be arranged and edited on every element basis: and editing analyzer means for receiving a user input through an input device as a graphical user interface event, analyzing the received event and determining processing procedures of the browser means and the edit data manager means, wherein each of the graphical user interface elements to be managed by the browser means has a constraint for the event, and the editing analyzer means includes means for sending a processing command previously defined for the event to the edit data manager means when the event satisfies the constraint of the corresponding graphical user interface element and for rejecting the user input corresponding to the event when the event fails to satisfy the constraint of the corresponding graphical user interface element.

In accordance with another aspect of the GUI editing system of the present invention, the editing analyzer means includes a plurality of analysis modes corresponding to different editing contents, in which processing commands corresponding to the received event are defined for each analysis mode, and also includes a mode transition table in which transition destination modes are defined for events to be generated for each analysis mode, the editing analyzer means determines one of said processing commands corresponding to the received event in accordance with the present analysis mode, and the analysis modes are shifted on the basis of the contents of the event and the mode transition table.

In accordance with a further aspect of the GUI editing system of the present invention, the edit data manager means includes means for classifying the graphical user interface data to be edited on the basis of a type of the data and according to an attribute of the graphical user interface element and managing the data as a tree structure data.

In accordance with yet a further aspect of the GUI editing system of the present invention, the edit data manager means includes means for setting a unique identifier with respect to the graphical user interface element fetched by an element movement command based on the analysis of the user input of the editing analyzer means; and when receiving the graphical user interface data by an element denotation command based on the analysis of the user input of the editing analyzer means, the browser means also includes means for accepting attributes of elements identified by the identifier set for each graphical user interface element with respect to the data and for adding elements included in the graphical user interface data and attributes thereof in an element database managed by the browser means.

As mentioned above, since the constraint (defining, e.g., "the type of a locatable element") is set for each of the GUI elements and the editing analyzer means judges whether or not the event (user input) based on the constraint is valid, a bug in the GUI data resulting at least from user's erroneous operation can be avoided and the quality of the GUI data can be suitably secured.

Further, since the editing analyzer means employs such 'mode' concept as mentioned above and the mode is shifted according to the contents of the event on the basis of the above mode transition table each time the event is generated, the processing contents of the same event or the same user input can be defined in various ways. This means that many functions of the GUI editing system can be realized smoothly through user's minimum input operation.

When the edit data manager means manages the GUI data to be edited as tree structure data as mentioned above, such GUI data or GUI element may be used in any GUI environments so long as the GUI environments can identify the structure.

In this case, when the above data of the tree structure to be managed is saved in the notation of S-expressions (symbolic expressions) which is often used in a LISP as one of artificial intelligence languages, the above GUI data or GUI element can be utilized more flexibly.

As mentioned above, furthermore, the edit data manager means sets the identifier for the fetched GUI element, the browser means extracts the element identified by the identifier and its attributes from the GUI data fetched based on data exchange with the edit data manager means and adds the extracted element and attributes to the element database managed by the browser means. As a result, the need for user's description for the denotation of the element can be eliminated, and the denotation of the desired element in the database can be realized semi-automatically, i.e., merely through user's operation of causing the editing analyzer means to interpret the event for the element denotation.

The effects of the present invention are summarized as follows.

Since the GUI editing system of the present invention is provided as a basic man-machine GUI interface and acts to accommodate restrictions and disadvantages which have so far occurred between the man and machine or OS, efficient and flexible GUI editing operation can be realized even under a general-purpose OS.

In the present invention, in particular, since the constraint is set for each of the GUI elements and the editing analyzer means judges whether or not the event (user input) based on the constraint is valid, user's erroneous operation can be avoided and the quality of the GUI data can be kept high.

According to the present invention, since a plurality of analysis modes are set for the editing analyzer means and the interpretation of the then event is automatically changed according to these analysis modes, high-degree GUI editing operation can be smoothly realized with a high efficiency.

Further, in the present invention, since the GUI data to be then edited is managed as tree structure data, flexible GUI development can be realized even in any GUI development environments.

In addition, in accordance with the present invention, since the denotation of the desired element in the database can be realized semi-automatically, i.e., merely through user's operation of causing the editing analyzer means to interpret the event for the element denotation, the user can highly easily improve or customize the editing system.

BRIEF DESCRIPTION OF THE DRAWINGS

FIGS. 3A and 3B show an example of contents of a mode transition table in an editing analyzer in FIG. 1;

FIG. 6 schematically shows, in a model form, how GUI element data to be handled in the editing system are managed on a memory.

DESCRIPTION OF THE PREFERRED EMBODIMENTS

Figure 1:
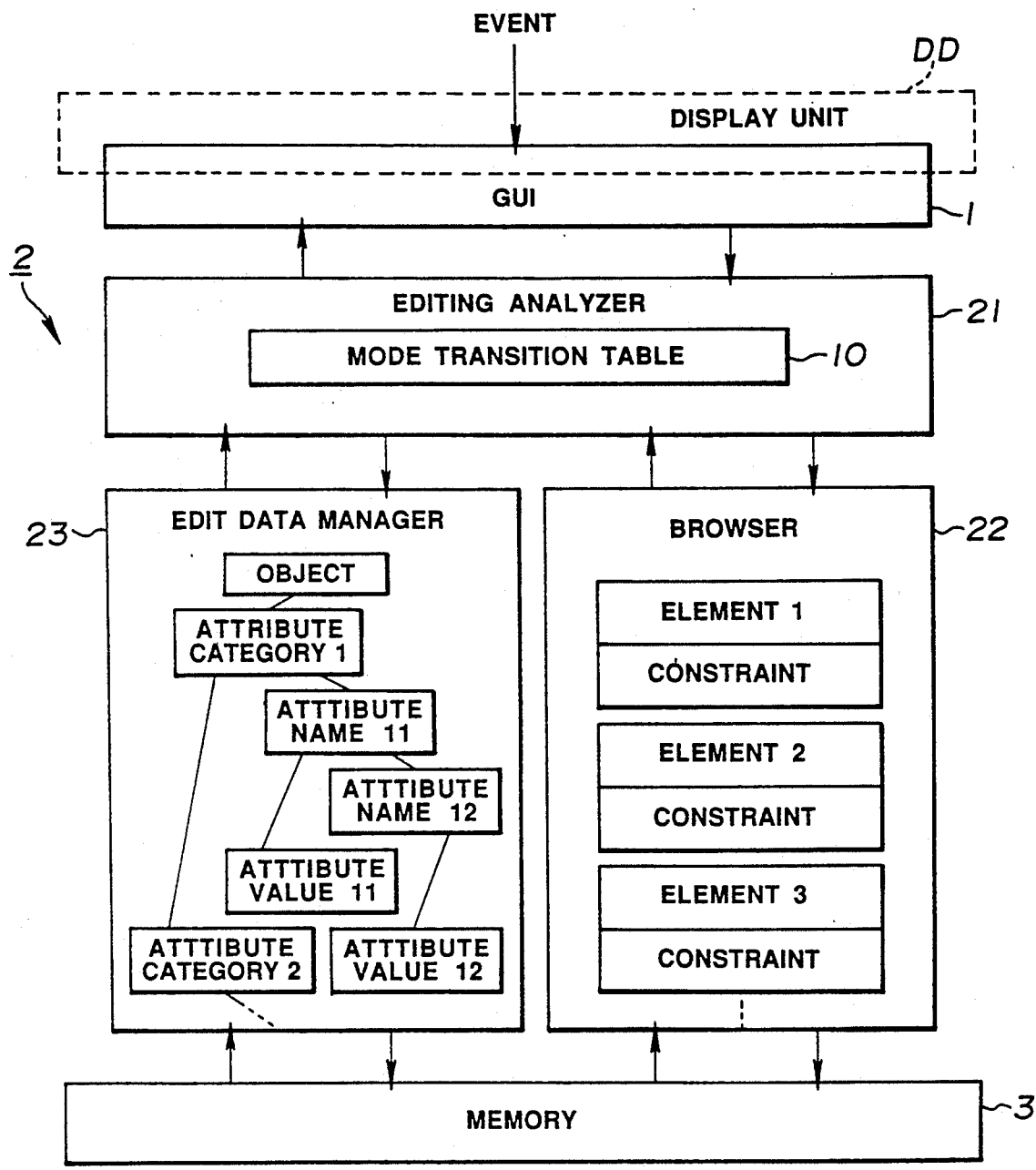
FIG. 1 is a block diagram of an arrangement of a GUI editing system in accordance with an embodiment of the present invention.

Referring to FIG. 1, there is shown an embodiment of a graphical user interface (GUI) editing system in accordance with the present invention. The present embodiment will be explained, for convenience of explanation, in connection with the case where an Athena Widget corresponding to the X window system version 11 known as one of GUI development environments under a UNIX as a general-purpose OS is used.

In FIG. 1, more specifically, a GUI 1 comprises an X window system as a control program for a display unit DD which visually displays and controls a GUI editing screen defined by the Athena Widget on the display unit DD. The GUI 1, when receiving a user input through such an input device (not shown) as a keyboard or a mouse for the display information on the display screen, accepts the user input as an event and informs a processor 2 which forms the main part of the editing system of the contents of the accepted event. In the editing system of the present embodiment, all processing to be explained in the following are carried out through message communication between the processor 2 and the GUI 1 (X window system).

Figure 2:
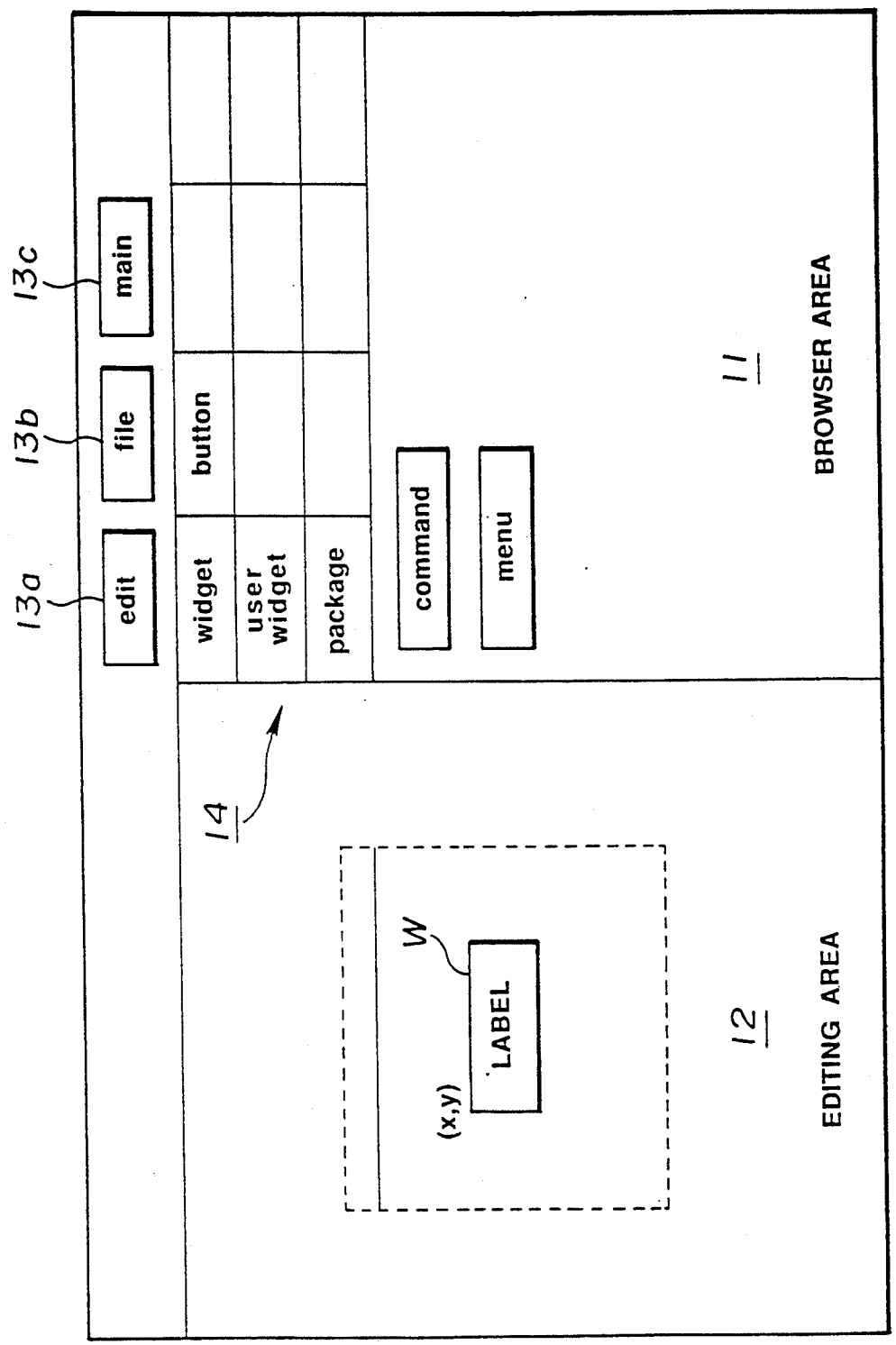
FIG. 2 is a plan view of an exemplary editing screen in the editing system.

Shown in FIG. 2 is an example of a display control screen on the display unit DD controlled through the GUI 1, in which reference numeral 11 denotes a browser area as a display window of a GUI element (Widget), 12 an editing area as an editing (designing) window of GUI data, reference symbols 13a, 13b and 13c denotation menu buttons for causing pull-down display of "edit", "file" and "main" menus respectively, 14 browsing buttons desired one of which is used to display a desired GUI element on the browser area 11. Editing (designing) operations of the GUI data to be detailed later as well as registering operations of GUI elements to be newly defined are all carried out through the GUI screen.

Turning again to FIG. 1, the processor 2, to which the event as the user input is informed from the GUI 1, includes roughly an editing analyzer 21 for analyzing the informed event according to the then editing state, a browser 22 for performing management mainly over the GUI elements operated through the browser area 11, and an edit data manager 23 for performing management over the GUI data designed or edited through the editing area 12. As mentioned above, the processor 2, which forms the main part of the editing system, backups the GUI editing work by the user through such cooperative operation of these constituent parts of the processor as mentioned above.

The editing system is designed to handle the respective elements of the GUI as objects. For this reason, these elements can be classified according to the class concept. The term "class" as used herein is used to define the specifications of objects having the same feature. Further incorporated in the present invention is such a concept of class inheritance. Thus, the definition of the aforementioned class is sufficient just to describe only a difference between the current class and its upper class.

Explanation will next be made in detail as to the functions of the respective constituent parts of the processor 2.

First, the edit data manager 23 manages the edit contents of the respective GUI elements called onto the editing area 12 (refer to FIG. 2) as already mentioned above. More in detail, the edit data manager 23, as shown in FIG. 1, handles the respective GUI elements as the aforementioned objects, classifies the elements into categories according to their attribute, and manages them based on a tree structure. In this connection, the term "category" corresponds to the aforementioned class and in the definition of a lower category, only a difference between the lower and its upper categories is used.

The edit data manager 23 has also a function of setting individual identifiers for the elements called to the editing area 12 (refer to FIG. 2) and returns the values of the set identifiers back to the editing analyzer 21 each time each identifier is set.

The browser 22 functions to manage the respective GUI element operated through the browser area 11 (refer to FIG. 2) as already mentioned above. Even in the management of these GUI elements in the browser 22, such an object-oriented concept as in the above is employed. The browser 22 further has a function of, when the user specifies an element to be registered as a new GUI element, automatically adding the specified element and its attribute to its element database on the basis of the identifier set at the edit data manager 23.

Each of the GUI elements to be managed at the browser 22, as shown in FIG. 1, has a constraint previously described and defined with respect to the array location and handling of the corresponding element. During editing operation using these elements, the editing analyzer 21 references the browser 22 to know whether or not the constraint of the associated elements are satisfied. Described in the constraint is, for example, "locatable element types". For example, on an element defined as a button, an element defined as another button or a window must not be positioned.

The editing analyzer 21 acts to analyze the event informed through the GUI 1 according to the present editing state. More specifically, the editing analyzer 21 has a plurality of analysis modes corresponding to different editing contents, in which modes different actions are defined for different events including such an event as informed above. The editing analyzer 21 has a mode transition table 10 in which destination transition modes are defined for events to be generated for the respective analysis modes. That is, an action for the informed event is determined according to the then analysis mode and the analysis mode is shifted on the basis of the contents of the event and the mode transition table 10. An example of the mode transition table 10 is shown in FIGS. 3A and 3B.

More in detail, the editing analyzer 21 has 12 basic modes of NORMAL (normal), SSELECT (single select), MSELECT (multi-select), COPY (copy), MOVE (move), DIRECTMOVE (direct move), CONSTRAINTSMOVE (constraints move ), RESIZE (resize), CREATE (create), PROPSHEET (property sheet), TEXTINPUT (text input), and CONFIRM (confirmation) modes. The editing analyzer 21, to which the above event is informed from the GUI 1, repetitively executes the following operations (1) to (3).

(1) Interprets the event according to the current mode.

(2) Activates an action previously defined in the mode on the basis of the contents of the interpreted event.

(3) Shifts to a mode corresponding to the contents of the event on the basis of the mode transition table shown in FIGS. 3A and 3B. For example, when the above event refers to "a state in which the left mouse button is depressed", the mode transition table is defined so that the editing analyzer 21 activates an action saying "select . . ." in the NORMAL mode and activates an action saying "place here . . ." in the MOVE mode. When the event in the NORMAL mode is associated with a click (user's action of pushing and quickly releasing the mouse button) on an element in the editing area 12 (refer to FIG. 2), the editing analyzer 21 is thereafter shifted to the SSELECT mode: whereas, when the event in the NORMAL mode is associated with a drag (user's action of moving the mouse while pushing the mouse button), the editing analyzer 21 is thereafter shifted to the CREATE mode. When the event in the MOVE mode is associated with a click at its movement destination, the editing analyzer 21 is thereafter shifted to the SSELECT mode.

The editing analyzer 21 also has a function of monitoring whether or not, each time the user performs an editing operation over one of the GUI elements, the generated event satisfies the constraint defined for the corresponding GUI element, as already explained above. In actual operations, the editing analyzer 21 activates the action defined according to the above mode and event only when the then event satisfies the constraint of the corresponding GUI element; whereas, the editing analyzer 21 carries out a suitable error processing cause, for example, an error message to be displayed on the display unit DD through the GUI 1) when the then event does not satisfy the constraint of the corresponding GUI element to thereby reject any user inputs associated with the event.

In this way, the substantial editing operation of the GUI data in the editing system of the present embodiment is realized through the processor 2 comprising the editing analyzer 21, the browser 22 and the edit data manager 23. The editing system of FIG. 1 also includes a memory 3 which stores and keeps therein the GUI elements to be managed through the browser 22 of the processor 2 and the GUI data to be managed through the edit data manager 23 of the processor 2.

Explanation will next be made as to the operation of the entire editing system of the present embodiment based on specific editing operations. First, when an element is added to a GUI data being edited as an example, the operation of the editing system corresponding to the then editing operation will be explained. More in detail, in this case, the user conducts such operations as to select a desired element from the browser area 11 and to locate at a desired position within the editing area 12 (for example, to drag).

Assume now that, in an editing process, the editing analyzer 21 is, e.g., in the SSELECT (single select) mode (for example, transition from the NORMAL (normal) mode to the SSELECT mode is carried out by clicking the left button of the mouse on the element in the editing area 12 (refer to FIG. 3A)). Under this condition, if the GUI element displayed on the browser area 11 is dragged (more specifically, the left button of the mouse is pushed), this causes the editing analyzer 21 to analyze the effect and to start its operation in such a manner as explained in the following on the basis of such an algorithm as shown in FIG. 4.

More specifically, the editing analyzer 21, when recognizing the assignment of the element in the browser area 11 based on the event notification from the GUI 1 as well as dragging of the element (more accurately, a depression of the mouse left button) (step S11 in FIG. 4), executes a series of operations (1) to (5) which follow.

(1) The editing analyzer 21 is shifted to the CREATE (create) mode on the basis of the mode transition table 10 (refer to FIG. 3A) (step S12 in FIG. 4) and waits for a release of the pushed mouse button at its dragging destination in the editing area 12 in the CREATE mode. The position at which the release of the mouse button is effected corresponds to the assigned array position of the corresponding element. The shift to the CREATE mode as well as the array position assignment of the selected element to the editing area 12 may be similarly realized by means of the menu operation through the 'edit' button 13a on the editing screen exemplified in FIG. 2. In this case, it is assumed that a mouse click for the 'edit' button 13a causes a pull down menu including such an item as "element addition" to be opened. Thereafter, when the user selects the item "element addition", this causes the editing analyzer 21 to be shifted to the CREATE mode. And when the user further clicks the mouse at a suitable position on the editing area 12, the editing analyzer 21 judges that the assignment of the array position of the corresponding element was effected.

Figure 4:
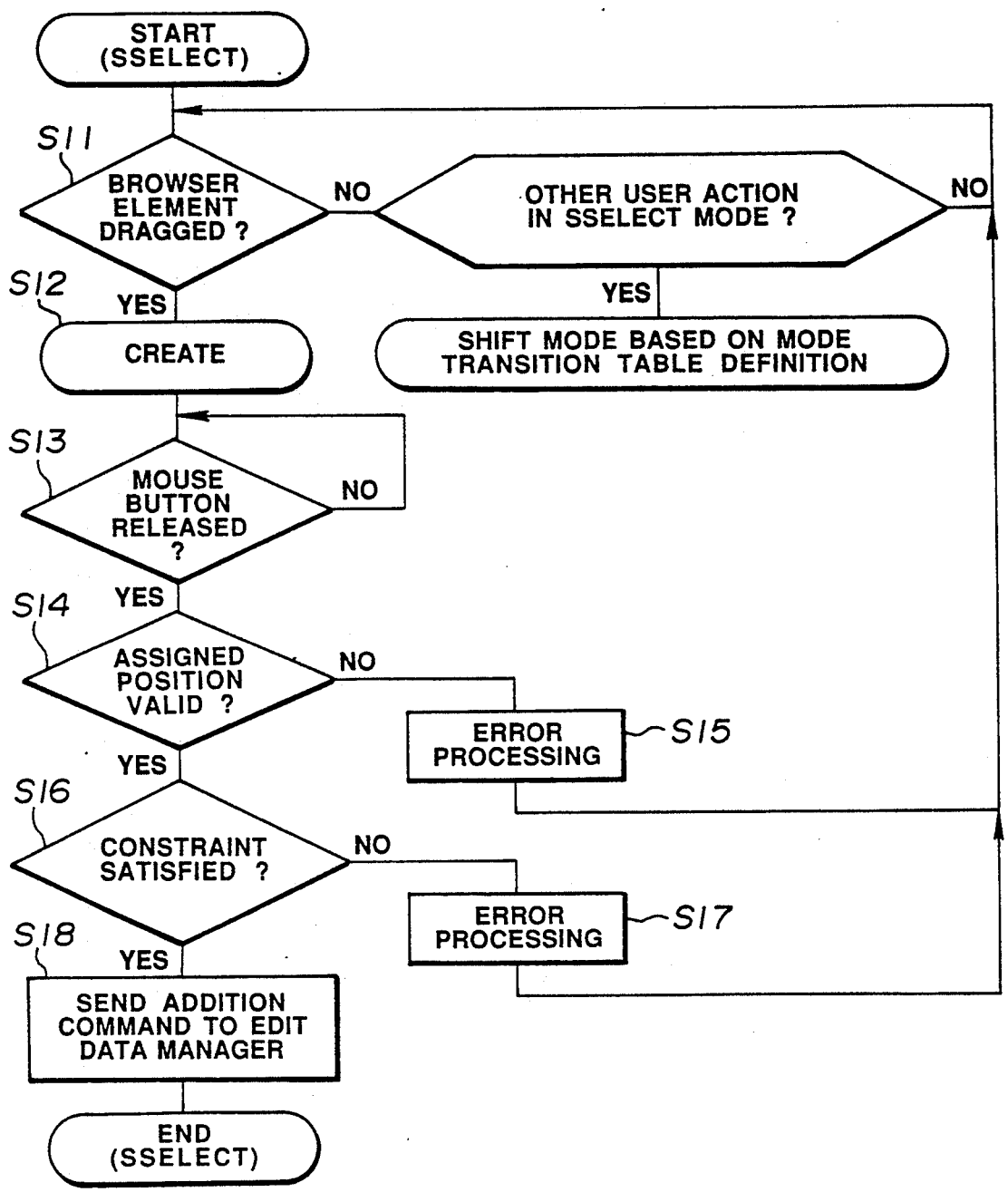
FIG. 4 is a flowchart showing an exemplary processing flow of the editing system when an element is added to GUI data being edited as an example.

(2) When the array position of the element is assigned through such a procedure (for example, a release of the mouse button) (step S13 in FIG. 4), the editing analyzer 21 judges whether or not the assigned position is valid (step S14 in FIG. 4). For example, in the event where the assigned position is out of the editing area 12 or when the element to be added is "button" or the like, if the editing analyzer 21 determines that the assigned position is out of the previously defined array window or that the assigned position is invalid, then the editing analyzer 21 performs such error processing as to display the corresponding error message on the display unit DD through the GUI 1 (step S15 in FIG. 4) and rejects the event.

(3) When determining that the assigned position is valid, the editing analyzer 21 extracts the aforementioned constraint from the attributes of elements previously positioned, and judges whether or not the constraint is satisfied (step S16 in FIG. 4). As mentioned earlier, such an element as defined as a button or a window must not be positioned on such an element as defined, for example, as another button. When the constraint is not satisfied, the editing analyzer 21 performs an error processing (step S17 in FIG. 4) as in the previous case and rejects the corresponding event.

(4) When determining that the both are valid, the editing analyzer 21 sends an addition command (Add command) to the edit data manager 23 to add the information of the corresponding GUI element to the edit data (step S18 in FIG. 4). The edit data manager 23, when receiving the Add command, adds the information of the GUI element to the edit data being managed therein, sets a new unique identifier for the same GUI element, and returns the set identifier back to the editing analyzer 21. As already explained in the foregoing, the edit data manager 23 also classifies the added GUI element into one of categories according to its attributes to manage the element based on the tree structure.

(5) Finally, a release of the mouse button on the editing area 12 causes the editing analyzer 21 to be shifted to the SSELECT mode (refer to Fig. 3B) and to wait for the generation of the next event.

Through such operations of the editing analyzer 21 as mentioned above and further through the aforementioned element information adding operation of the edit data manager 23, the GUI element additionally assigned by the user can be safely and reliably added to the GUI data being edited, with flexibility. As will be clear from the mode transition table of FIG. 3A, for example, when the user thereafter clicks the left button of the mouse on the background of the editing screen, this causes the editing system (more accurately, editing analyzer 21) to be returned back to the NORMAL mode defined as the initial state.

Then, explanation will be made as to the operation of the editing system, for example, when the GUI element on the editing area 12 is registered in the element database of the browser 22. In this case, the user selects a desired GUI element to be registered from the GUI elements on the editing area 12 and conducts such an operation as to drag the selected element within the browser area 11 through the exemplary GUI editing screen of FIG. 2.

Assume now that, in an editing process, the editing analyzer 21 is, e.g., in the SSELECT (single select) mode as in the above case and in this mode, the GUI element being displayed on the editing area 12 is dragged (more accurately, the left button is pushed). Then the editing analyzer 21 analyzes the above state and starts its operation in such a manner as to be explained in the following on the basis of such an algorithm as shown in FIG. 5.

More specifically, the editing analyzer 21, when recognizing the assignment of the element in the editing area 12 based on the event notification from the GUI 1 as well as dragging of the element (more accurately, a depression of the mouse left button) (step S21 in FIG. 5), carries out a series of operations (1) to (5) which follow.

(1) The editing analyzer 21 is shifted to the DIRECTMOVE (direct move) mode on the basis of the mode transition table 10 (refer to FIG. 3A) (step S22 in FIG. 5) and waits for a release of the pushed mouse button at its dragging destination in the browser area 11 in the DIRECTMOVE mode.

Figure 5:
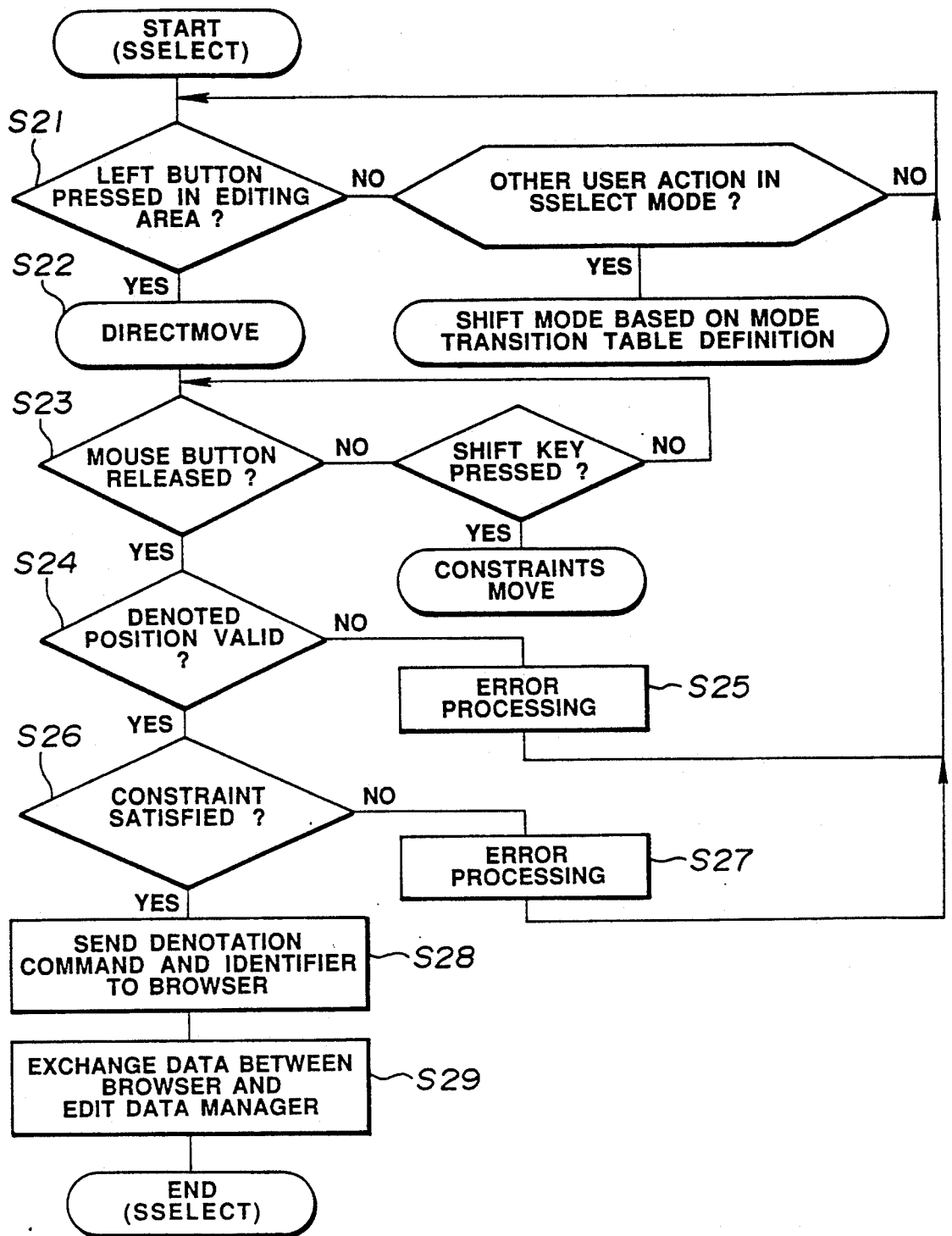
FIG. 5 is a flowchart showing an exemplary processing flow of the editing system when a GUI element in an editing area is newly registered as an element denotation as an example.

(2) When the element denotation is assigned by means of a release of the mouse button (step S23 in FIG. 5), the editing analyzer 21 judges whether or not the denotation position is valid (step S24 in FIG. 5). For example, when the position is out of the browser area 11 or when the assigned position is invalid, the editing analyzer 21 performs such an error processing as to display the corresponding error message on the display unit DD through the GUI 1 (step S25 in FIG. 5) and rejects the corresponding event.

(3) Then when determining the aforementioned denotation position is valid, the editing analyzer 21 extracts the aforementioned constraint from the attributes of the located element and judges whether or not the constraint is satisfied (step S26 in FIG. 5). However, any elements can be accepted in the browser 22. For this reason, the editing analyzer 21 will not usually carry out an error processing in this process (step S27 in FIG. 5).

(4) When determining that the both are valid, the editing analyzer 21 transfers to the browser 22 a denotation command as well as an identifier set and added by the edit data manager 23 to the corresponding GUI element to additionally register the information of the corresponding GUI element in the element database of the browser 22 (step S28 in FIG. 5). The browser 22, when receiving the denotation command and the identifier, executes the following operations (4-1) and (4-2) between the edit data manager 23 through the editing analyzer 21 to additionally register the information of the assigned GUI element in the GUI element database controlled by the browser 22 itself (step S29 in FIG. 5).

(4-1) The browser 22 first transfers the received identifier to the edit data manager 23 to call a function and accepts the attributes of the corresponding element and its attribute values as return values.

(4-2) The browser 22 adds the accepted element attributes and attribute values to the database as the information of the GUI element subjected to the denotation command, through user's dragging operation.

(5) The editing analyzer 21 is shifted to the SSELECT mode through user's release of the mouse button on the browser area 11 (refer to FIG. 3B) and waits for the generation of the next event.

Through such operations of the editing analyzer 21 as mentioned above and further through the aforementioned element registering operation of the browser 22, the GUI element assigned for its denotation by the user can be simply and reliably additionally registered in the GUI element database, with flexibility. Also in this case, when the user thereafter clicks the left mouse button on the background of the editing screen, this causes the editing system (more accurately, editing analyzer 21) to be returned back to the NORMAL mode defined as the initial state.

Figure 7:
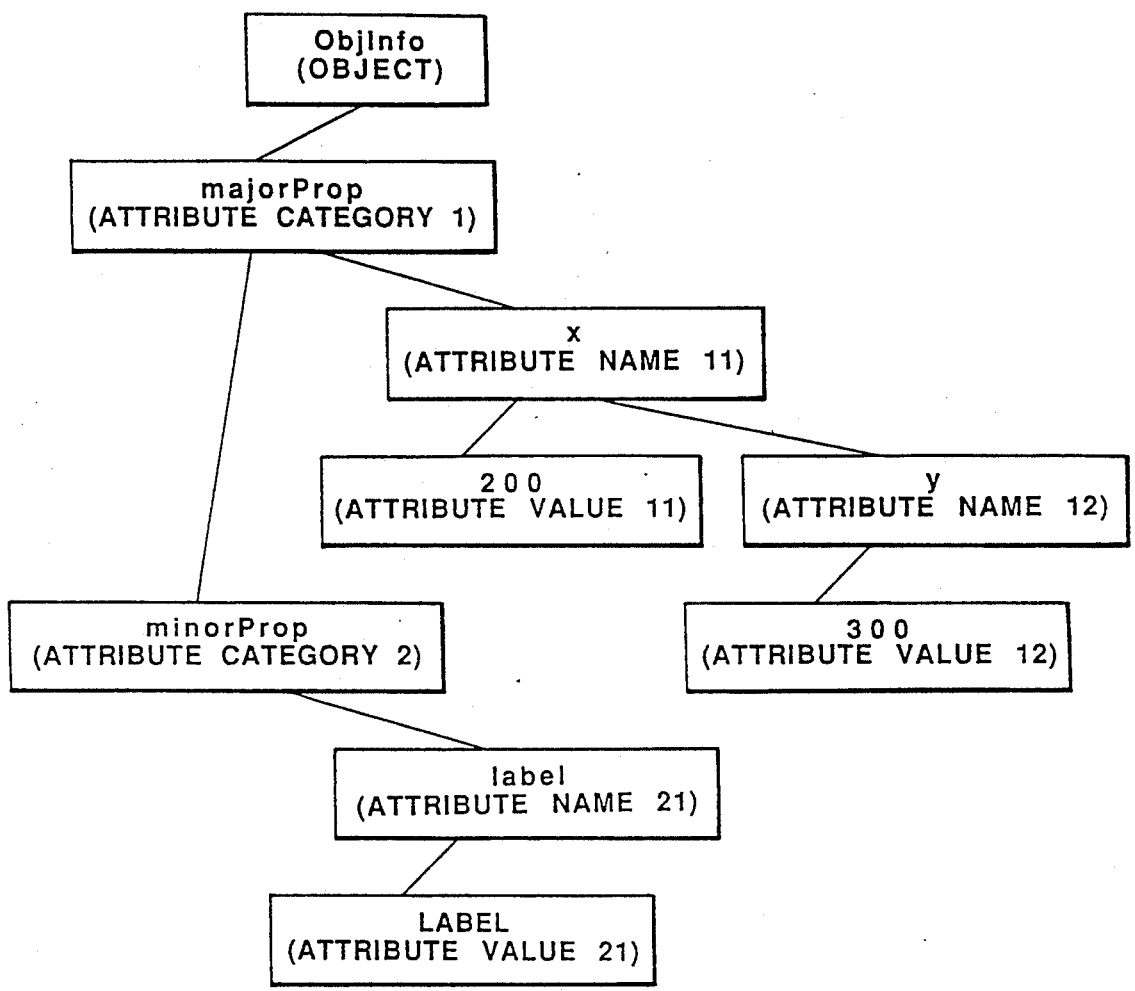
FIG. 7 schematically shows, in a model form, how GUI information to be handled in the editing system is managed on a memory.

Finally, explanation will be directed to the data structure of the GUI elements handled by the editing system of the present embodiment and also to the management structures of such GUI elements on the memory 3 and on the file, by referring to FIGS. 6 and 7.

As explained earlier, the data of a GUI element handled by the editing system is represented in terms of its attributes and attribute values. And the attributes are classified into categories according to the properties of the attributes and described with use of a tree structure. In this case, a category is represented by a structure "Category", an attribute name is by a structure "Prop", and an attribute value is by a structure "Value", respectively. Here are records when expressed in C language.

```
struct Category {
        /*structure assignment*/
    struct Class *next,
        /*pointer to next category record*/
    char *name,
        /*attribute category name*/
    struct Props *prop
        /*pointer to attribute belonging
          to category*/
}
struct Prop {
        /*structure assignment*/
    struct Props *next,
```

```
        /*pointer to next attribute record*/
    char *name,
        /*attribute name*/
    struct Value *value
        /*pointer to attribute value*/
}
struct Value {
        /*structure assignment*/
    char* sv
        /*character-string type value*/
}
```

Explanation will be made as to how such elements are classified on the basis of their attributes by taking an example.

For example, in the case of such an element W as exemplified in the editing area 12 in FIG. 2, the element W has an attribute "(x, y)" as an attribute indicative of its location and also has an attribute "label" indicative of a character string represented on the element W. In this connection, it is here assumed that these "x", "y" and "label" are all "char (character type)" pointers and have values of "200", "300" and "LABEL", respectively.

This means that the position attribute of the element and the character-string attribute represented on the element were defined as attribute types.

As will be seen from the consideration of the contents of such attributes as mentioned above, the aforementioned position attribute is defined for all elements but the aforementioned character-string attribute is not defined for all the elements. For example, such a "command button" element as mentioned above has such a character-string attribute; whereas such a "scroll bar" element has no such character-string attribute.

From the above consideration, it will be appreciated that the aforementioned location attribute can be classified into a "majorProp (major property)" category as a major category to which all elements belong; while the aforementioned character-string attribute can be classified into a "minorProp (minor property)" category as a minor category to which all the elements do not belong.

When the data of the GUI elements classified into respective categories are to be saved in the memory 3, the GUI element data are allocated to associated areas on the memory 3 according to the above category records "majorProp" and "minorProp", in such a format as, for example, shown in FIG. 6.

In the example of FIG. 6, more in detail, the record "majorProp" area is allocated to an address "10" on the memory 3, whereas the record "minorProp" area is allocated to the address "20" on the memory 3. Further, in order to link or chain these category records, an address "20" as the storage address of the "minorProp" record is stored in a Next field next to the "majorProp" record, and "nil" indicating that the next is absent is stored in a Next field next to the "minorProp" record. Also allocated to the memory 3 are record "Prop" areas for storing therein the attribute names "x", "y" and "label". These "x", "y" and "label" areas have addresses of "30", "40" and "60" on the memory 3, respectively. Furthermore, in order to chain the records of attributes classified into the same category as associated with one another, the address "40" as the storage address of the record "y" in a Next field of the record "x", the address "30" as the storage address of the record "x" is stored in the "Prop" field of the category record "majorProp", and the address "60" as the storage address of the record "label" is stored in the "Prop" field of the category record "minorProp", respectively. Stored in Next fields of the records "y" and "label" are "nil's" indicating the next is absent. In the memory 3, "Value" areas for storing therein the values of the records "x", "y" and "label" are allocated to addresses of "50", "80" and "70" respectively. These values of the addresses are given in the respective "value" field of the records "x", "y" and "label", and the aforementioned values of "200", "300" and "LABEL" are stored in respective "sv" fields of the record "Value".

In this way, in accordance with the editing system of the present embodiment, it is unnecessary to allocate fixed areas to respective elements and element management on the memory is carried out based on such data as to have the aforementioned structure, whereby element management can be realized with high flexibility while not restricted by the GUI environment.

The edit (design) data of such GUI elements, i.e., logical management structure on a file can be expressed, in the case of such an element (the button element W on the editing area 12 in FIG. 2) as listed above for example, in the form of such a tree structure as shown in FIG. 7.

In other words, the data of such an element is described in terms of items and sets of such items as shown in FIG. 7. As explained above, items having similar properties are classified into categories, which having similar types are further upper-classified, that is, the items are classified in the form of a hierarchical structure. In the editing system of the present embodiment, such a structure is represented with use of the S-expressions (symbolic expressions.

As already explained earlier, the S-expressions refer to the symbolic expressions often used in LISP as one of artificial intelligence languages. In the S expression, an item structure is expressed in terms of combinations of "parentheses ( )", items in the same hierarchy are described in the same set of "parentheses ( )", and items in a hierarchically lower by one than the former hierarchy are described in another set of "parentheses ( )" included in the upper "parentheses ( )". In this way, the hierarchical structure is represented in terms of the S-expressions.

For example, assume that such an aforementioned element as exemplified in FIG. 7 has two sorts of categories "majorProp" and "minorProp", the category "majorProp" has attributes "x" and "y", the category "minorProp" has an attribute "label", and these attributes have values of "200", "300" and "LABEL" respectively. Then the data of this element is represented in terms of the following S-expressions.

```
(ObjInfo (majorProp (x "200")(y "300"))
         (minorPro (label "LABEL")))
```

In accordance with the editing system of the present embodiment, in this way, since even edit (design) data are managed based on the hierarchical structure flexibly represented in the notation of the S-expressions while not fixing the definition language of the data, highly flexible data management can be realized while not limited by the GUI environment.

Although explanation has been made in connection of the case where the Athena Widget corresponding to the X window system version 11 has been employed to form the GUI editing system in the foregoing embodiment, it will be appreciated that the editing system in accordance with the present invention is not restricted to the specific environment and operating system (OS) but the present invention may be similarly applied to other GUI environments and even to a GUI environment formed based on another OS, as a matter of course.

What is claimed is:

1. A graphical user interface editing system comprising:
   memory means for storing as a graphical user interface database a plurality of graphical user interface elements constituting a graphical user interface; said memory means also storing graphical user interface data corresponding to said graphical user interface and comprising said graphical user interface elements as unit elements;
   browser means for managing said plurality of stored graphical user interface elements;
   edit data manager means for editing and managing the graphical user interface data corresponding to said graphical user interface;
   user input means for receiving a user input as an event of the graphical user interface;
   editing analyzer means for analyzing the event received from the user input means and issuing to the browser means and the edit data manager means a previously defined processing command;
   wherein said browser means stores a constraint for the event in correspondence with each of the graphical user interface elements, and
   the editing analyzer means issues said previously defined processing command to the browser means and the edit data manager means when the event satisfies the constraint corresponding to the graphical user interface element which is a target of the event.

2. A graphical user interface editing system as set forth in claim 1, wherein the edit data manager means classifies an attribute of each of said graphical user interface elements constituting the graphical user interface data in accordance with a category and manages the classified elements as tree structure data.

3. A graphical user interface editing system as set forth in claim 2, wherein said edit data manager means stores the tree structure data in the notation of symbolic expression.

4. A graphical user interface editing system as set forth in claim 1, wherein said edit data manager means sets a unique identifier for said graphical user interface element fetched from said graphical user interface element database on the basis of a processing command issued from said editing analyzer means, and the browser means, on the basis of said processing command issued from the editing analyzer means, identifies in accordance with said identifier each of said graphical user interface elements constituting said graphical user interface data edited by the edit data manager means and registers the identified elements together with attributes thereof into the graphical user interface element database.

5. A graphical user interface editing system as set forth in claim 1, further including a plurality of analysis modes, each of said analysis modes corresponding to a different editing content wherein said editing analyzer means includes a mode conversion table in which a processing command corresponding to the event is defined for each of said analysis modes, and in which transition destination modes are defined for events to be generated for each of said analysis modes, and said editing analyzer means determines one of the processing commands corresponding to the event in accordance with the analysis mode and shifts said analysis modes in accordance with the event and the defined content of the mode conversion table.

6. A graphical user interface editing system as set forth in claim 5, wherein said edit data manager means classifies an attribute of each of said graphical user interface elements constituting said graphical user interface data as a category and manages said classified elements as tree structure data.

7. A graphical user interface editing system as set forth in claim 6, wherein said edit data manager means stores said tree structure data in the notation of symbolic expressions.

8. A graphical user interface editing system as set forth in claim 5, wherein said edit data manager means sets a unique identifier for each graphical user interface element fetched from said graphic user interface element database on the basis of a processing command issued from said editing analyzer means, and said browser means, on the basis of said processing command issued from said editing analyzer means, identifies in accordance with said identifier each of said graphical user interface elements constituting said graphical user interface data edited by said edit data manager means and registers said identified elements together with attributes thereof into said graphical user interface element database.

9. A graphical user interface editing system comprising:
   memory means for storing as a graphical user interface database a plurality of graphical user interface elements constituting a graphical user interface said memory means also storing graphical user interface data corresponding to the graphical user interface and comprising said graphical user interface elements as unit elements;
   browser means for managing said plurality of graphical user interface elements stored as said graphical user interface database in the memory means;
   edit data manager means for editing and managing said graphical user interface data corresponding to said graphical user interface stored in said memory means;
   user input means for receiving a user input as an event of said graphical user interface; and
   editing analyzer means for analyzing the event received from said user input means and issuing to the browser means and said edit data manager means a processing command previously defined for the event,
   wherein said editing analyzer means includes a mode conversion table in which a processing command corresponding to the event is defined for each of a plurality of analysis modes, and in which transition destination modes are defined for events to be generated for each of said analysis modes, and
   the editing analyzer means determines one of the processing commands corresponding to the event in accordance with the analysis mode and shifts the analysis modes in accordance with the event and the defined content of the mode conversion table.

10. A graphical user interface editing system comprising:

memory means for storing as a graphical user interface database a plurality of graphical user interface elements constituting a graphical user interface and also storing graphical user interface data corresponding to said graphical user interface and composed of said graphical user interface elements as unit elements;

browser means for managing said plurality of graphical user interface elements stored as said graphical user interface database in the memory means;

edit data manager means for editing and managing said graphical user interface data corresponding to said graphical user interface stored in the memory means;

user input means for receiving a user input as an event of said graphical user interface; and editing analyzer means for analyzing the event received from said user input means and issuing to said browser means and said edit data manager means a previously defined processing command, wherein said edit data manager means classifies an attribute of each of the graphical user interface elements constituting the graphical user interface data in accordance with a category and manages the classified elements as tree structure data.

11. A graphical user interface editing system as set forth in claim 10, wherein said edit data manager means stores the tree structure data in the notation of symbolic expressions.

12. A graphical user interface editing system comprising:

memory means for storing as a graphical user interface database a plurality of graphical user interface elements constituting a graphical user interface and also storing graphical user interface data corresponding to said graphical user interface and comprising the graphical user interface elements as unit elements;

browser means for managing said plurality of graphical user interface elements stored as said graphical user interface database in said memory means;

edit data manager means for editing and managing said graphical user interface data corresponding to the graphical user interface stored in said memory means;

user input means for receiving a user input as an event of said graphical user interface; and editing analyzer means for analyzing the event received from the user input means and issuing to the browser means and the edit data manager means a previously defined processing command, said previously defined processing command causing a graphical user interface element to be fetched from said graphic user interface element database, wherein said edit data manager means sets a unique identifier for each of said fetched graphical user interface elements, and said browser means, on the basis of said previously defined processing command, identifies in accordance with said unique identifier each of said graphical user interface elements constituting said graphical user interface data edited by said edit data manager means and registers said identified elements together with attributes thereof into said graphical user interface element database.

* * * * *